W. WRIGHT.
COMPUTING ATTACHMENT FOR TYPE WRITERS.
APPLICATION FILED NOV. 1, 1915.

1,269,892.

Patented June 18, 1918.
5 SHEETS—SHEET 1.

WITNESSES:
W. O. Westphal
Julius Duststine

INVENTOR:
Walter Wright
BY B. C. Stickney
ATTORNEY.

W. WRIGHT.
COMPUTING ATTACHMENT FOR TYPE WRITERS.
APPLICATION FILED NOV. 1, 1915.

1,269,892.

Patented June 18, 1918.
5 SHEETS—SHEET 3.

W. WRIGHT.
COMPUTING ATTACHMENT FOR TYPE WRITERS.
APPLICATION FILED NOV. 1, 1915.

1,269,892.

Patented June 18, 1918.
5 SHEETS—SHEET 5.

WITNESSES:

INVENTOR:
Walter Wright
BY
B. E. Stickney
ATTORNEY

UNITED STATES PATENT OFFICE.

WALTER WRIGHT, OF NEW YORK, N. Y., ASSIGNOR TO UNDERWOOD COMPUTING MACHINE COMPANY, OF NEW YORK, N. Y., A CORPORATION OF NEW YORK.

COMPUTING ATTACHMENT FOR TYPE-WRITERS.

1,269,892.    Specification of Letters Patent.    Patented June 18, 1918.

Original application filed April 1, 1907, Serial No. 505,492. Divided and this application filed November 1, 1915. Serial No. 59,002.

*To all whom it may concern:*

Be it known that I, WALTER WRIGHT, a citizen of the United States, residing in New York, in the county of New York and State of New York, have invented certain new and useful Improvements in Computing Attachments for Type-Writers, of which the following is a specification.

This application is a division of my application No. 505,492, filed April 1, 1907, renewed July 1, 1909, and patented November 9, 1915, No. 1,160,102. In said application there is disclosed a series of power-driven computing wheels, and associated with said wheels is a power-driven carry-over mechanism. Reference is made to said patent for specific description of parts shown or referred to herein.

This application is specific to a machine in which the number wheels are actuated by the keys, as distinguished from a machine in which the number wheels are driven by power, as in said application. It is found in practice that the operation of one number wheel by the key does not add a prohibitive load to said key, that is, it does not make it so hard to operate as to be objectionable; but where the key is also called upon to furnish the power to operate one or more carry-over trains, it sometimes makes the touch on the key too hard, especially where the carry-over operation proceeds along many trains simultaneously. Moreover the completion of the carry-over operation along a large number of wheels renders the touch upon the key even harder, owing to the use of individual spring detents for the number wheels. If the depth of stroke of the key is made short, its resistance to operation when performing all of this work is often objectionable.

It is the object of this invention to provide a machine in which the number wheels shall be directly driven by the keys, thus avoiding the necessity of using a complicated power-driven indexing mechanism, but without incurring the difficulty encountered where the carry-over devices are also driven by the keys. To this end, I have provided for the carry-over devices to be driven by a source of power separate from the wheel-driving keys.

In the preferred form of the invention, the keys directly drive the number wheels, and the latter start into action certain carry-over trains, which are connected up to a source of power, which drives them independently of the power applied to the keys. The invention, however, may be regarded as broad enough to include the combination with key-actuated number wheels, of devices to assist the carry-over devices at the operation of the keys, even though said assisting devices are operated otherwise than by a separate source of power.

Other features and advantages will hereinafter appear.

In the accompanying drawings.

*Connection.*—Referring to the drawings, 1 (Fig. 1) indicates the frame of a typewriting machine, which may be of any standard construction, but, for the purpose of illustration, is herein shown as a "Monarch" machine. Secured upon the right-hand side of the frame is a plate 2 having an extension or arm 3, at the end of which is supported a vertical plate 4, on which is mounted an upright shaft 41, and which forms bearings for a universal driving shaft 190, master wheel shaft 35, and correction and dial wheel releasing mechanism; the upright shaft 41 serving as a connection in the transmission of rotation from the universal shaft 190 to the master wheel shaft 35. The shaft 35 extends between the plate 4 and a frame 38 secured on the left-hand side of the frame of the typewriting machine. On the end of said shaft extending through the plate 4 is a bevel gear 39, which is engaged by a bevel gear 40 on the shaft 41 carrying a bevel gear 42 meshing with a bevel gear 43 on the shaft 190.

The computing shaft 35 is directly driven by the operation of the numeral key levers 16 at angular distances directly proportional to the value of the numeral key depressed. That is, one-tenth of a revolution per digital value of the depressed numeral key. For this purpose there is provided the shaft 190 upon which are secured levers 191, one for each numeral key, the front end of each lever being adapted to be engaged by an upward extension 192 from the key lever 16, the rear end of said lever 191 being adapted to strike a rear upward extension 193, when the key lever is depressed. A spring 194 attached to an arm 195 of each lever 191, returns said lever 191 to its original position. The shaft 190 is rocked to an extent dependent upon the numeral key depressed by reason of the fact that the levers 191 are arranged on said shaft at different angles for the several numeral keys. The backward movement of the shaft 190 is limited by a rod 196. Upon the depression of any numeral key, the extension 193 engages a lever 197 pivoted at 198, and rocks said lever. The lever 197 is connected by a link 199 with a bell-crank lever 200 which is connected with a rod 133 connected with the release mechanism hereinafter described, so that upon the depression of any key 16, the computing wheel locking mechanism is released.

Figures 1, 2, 3:
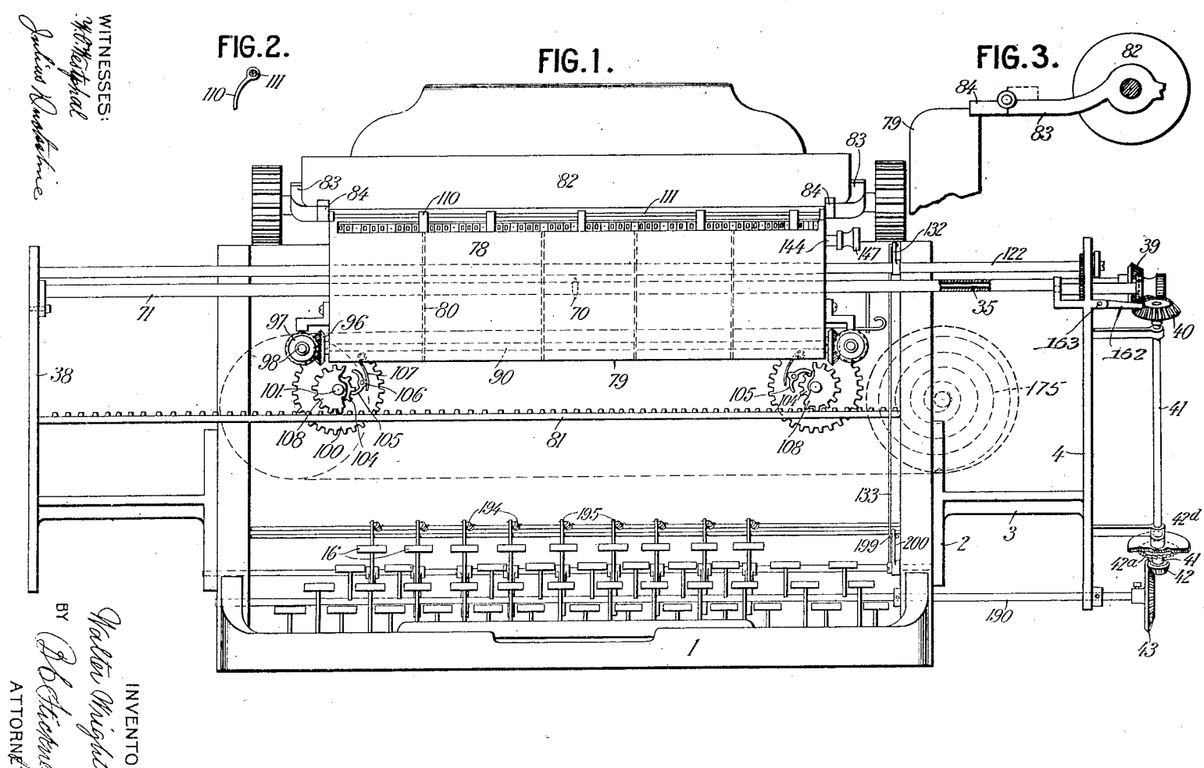
Figure 1 is a front view of a typewriting machine equipped with my improvement.
Fig. 2 is a detail side view of one of the shutters.
Fig. 3 is a side view showing one of the arms by which the computing carriage is moved with the typewriter carriage.
Figures 4, 5:
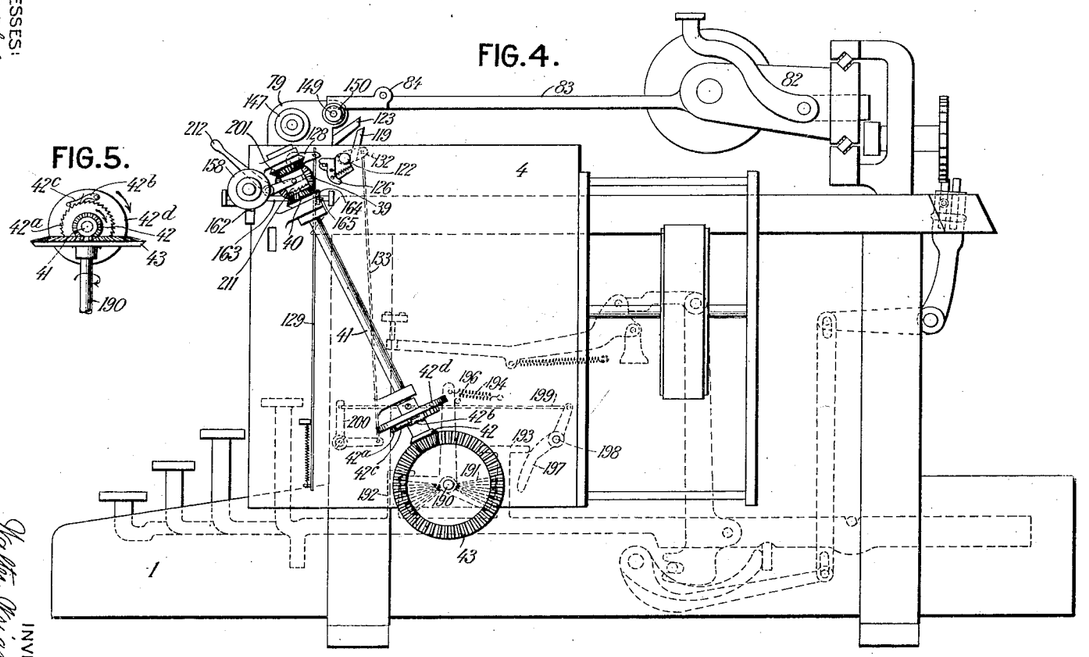
Fig. 4 is a diagrammatic side elevation of the well-known Monarch typewritting machine with my improvements connected thereto.
Fig. 5 is a detail view of the pawl and ratchet mechanism mounted on the upright shaft at the right side of the machine, looking upwardly from the bottom.

The depression of a numeral key causes the shaft 190 to rotate in counter-clockwise direction, looking from the right, which causes the beveled gear 43 fast to the right end of the shaft 190 to rotate therewith; said rotation being transmitted through the beveled gear 42, fast to a pawl and ratchet mechanism, as in the patent to Ludlum, 384,373. The beveled gear 42 is loose on the shaft 41 and is fast to a ratchet wheel $42^a$ adapted to engage the front end of a pawl $42^b$, which is pressed into mesh with said ratchet wheel by a spring $42^c$; said pawl and spring being mounted on a disk $42^d$ fast on the shaft 41. Said counter-clockwise rotation of the gear 43 causes a rotation, front side rightward of the gear 42, as seen in Figs. 1 and 4, which causes the ratchet wheel $42^a$ to rotate therewith and through the intermediary of the pawl $42^b$ and disk $42^d$, causes the shaft 41 to rotate in the same direction as the gear 42 on the downward stroke of the numeral key. On the upward stroke of the numeral key, the gear 43 is rotated in clockwise direction, which causes a rotation of the gear 42, in a direction opposite to that in which it has been rotated at the downward stroke of the numeral key. The rotation of the beveled gear 42 at said up stroke of the numeral key, is however, not transmitted to the shaft 41, since the backward rotation of the ratchet wheel $42^a$ will not be transmitted to the pawl $42^b$, the end of which will snap over the teeth of the ratchet wheel $42^a$ during said backward rotation. It will be seen that rotation is transmitted to the computing shaft only at the down stroke of the numeral key; the backward rotation of the universal shaft 190 being idle.

*Computing mechanism.*—The computing shaft 35 rotates but has no longitudinal movement. Secured to said computing shaft at the center are one or more teeth 70, (Figs. 1, 6, 8, 10, 19, 20, and 21), two being here shown. Surrounding the shaft 35 are two tubes 71, one on each side of the central teeth 70, which are provided primarily for the purpose of reducing the friction of said shaft and permitting it to turn more easily, and on said tubes are supported a series of computing wheels 72, corresponding to letter spaces of the typewriting machine. These computing wheels move with the typewriter carriage to the left and thus pass in succession over the teeth 70 extending from the computing shaft, and of said computing wheels only that one immediately over or around said central part of the shaft carrying said teeth is directly operated by the rotary movement of said shaft. Each computing wheel is formed as an internal gear wheel having ten recesses or notches 73, and, as the typewriter carriage is moved to the left by its spring 175, under the control of the keys, as usual in the Monarch machine, a pair of opposite notches, on each wheel 72 in succession are brought into engagement with the teeth 71 on the computing shaft, no matter in what angular position said teeth were left by the last preceding operation. Consequently, when the computing shaft is rotated, by the mechanism heretofore described, upon the depression of any numeral key, the computing wheel which is at the center of said shaft is correspondingly rotated. Said computing wheel is formed with external gear teeth 74, which mesh with a pinion 75, which in turn meshes with gear teeth 76 formed at the side of a figure wheel 77, the face of said wheel carrying the figures 0 to 9. Consequently, said figure wheel is given a rotation corresponding in extent to that of the computing shaft, and to the particular numeral key depressed.

A casing 78 is provided, (Figs. 1 and 9) covering the figures of all the figure wheels except one row, the figures of which indicate the result of the computation made. For instance, if any figure wheel stands so that the figure "7" is displayed, and then the numeral key "2" is depressed, then, upon the depression of said key, said figure wheel is advanced so that the figure "9" is displayed. The carriage 79 which carries the computing wheels is separated into compartments by vertical partitions 80 consisting of thin plates which pass between adjacent computing and figure wheels, and they brace and strengthen the computing carriage 79.

Figures 24, 25, 26, 27, 28, 29, 30:
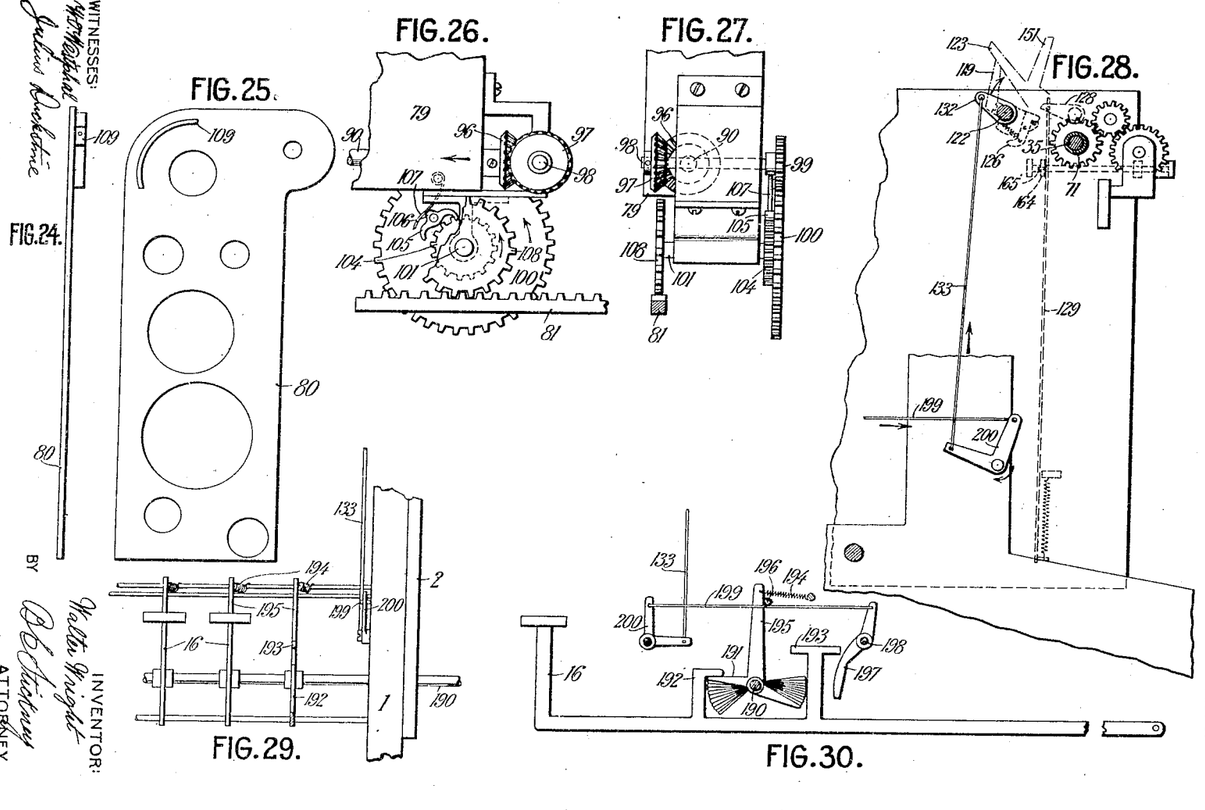
Fig. 24 is a front view of one of the partitions in the computing carriage.
Fig. 25 is a detail side view of the same.
Fig. 26 is a broken front view of the attachment to the computing carriage, for effecting a transfer from one wheel to the next.
Fig. 27 is a broken end view of the same.
Fig. 28 is a view of an end plate of the attachment viewed from the inside.
Fig. 29 is a fragmentary front view of the right end of the machine, showing the numeral keys and connections to the driving shaft.
Fig. 30 is a detail side view of a numeral key, its connections to the driving shaft, and computing wheel releasing mechanism.

The carriage is provided with gear wheels 108 (Figs. 1, 26, and 27) which run on a rack 81, and is advanced with the typewriter carriage 82 by means of arms 83 extending forward from the typewriter carriage and carrying fingers 84 pivoted on the ends of said arms, which, when moved down, engage the ends of the computing carriage, and move it with the typewriter carriage. When said fingers are moved up and thrown back as shown in dotted lines (Fig. 3), the computing carriage can be longitudinally moved independently of the typewriter carriage.

*Transferring.*—In order to carry on from one wheel to the next when a number is added to the previous number on said wheel so as to make the total greater than nine, there is formed at the left side of each computing wheel a lug or tooth 85, (Figs. 8, 10, 11, and 12) which, in the rotation of the computing wheel, is adapted to be brought into engagement with a tooth 86 on a primary transfer wheel 88, partly turning said wheel 88. The teeth of this primary transfer wheel engage broader teeth 89 (Fig. 6), ten in number, on the next computing wheel to the left, and advance the same one-tenth of a revolution. However, this transfer wheel does not, by its mere movement due to the advance of the lug 85 on the computing wheel, impart said advance, but auxiliary mechanism is provided to completely accomplish this result. Such mechanism is preferred because it is found that, without such auxiliary mechanism, when a large number of such wheels stand at 9, or in the position in which the transfer is to be effected to the wheel of the next higher denomination, and it is necessary that all of said transfers should be made at once, which they would necessarily do if made directly and without such auxiliary mechanism, the resistance caused by having to transfer so many wheels simultaneously is very great, causing a drag in the operation of the computing mechanism. Such a condition, although occuring very rarely, is possible, and such tardiness of operation might vitiate the accuracy of the machine. As a means of avoiding this objection, I provide an auxiliary mechanism the main element of which is a secondary transfer shaft 90. For convenience, the mechanism for operating this shaft will be described later. For the present it is sufficient to say that said transfer shaft rotates in the direction shown by the arrows in Figs. 6 and 8 when the operation is that of addition, and in the opposite direction when the operation is that of subtraction. The transfer is therefore effected in the following manner: When the lug 85, moving in the direction of the arrow shown in Fig. 8, has made a complete revolution with the computing wheel upon which it is formed, it impinges against the rear side of the narrow tooth 86 on the wheel 88, which is loose upon the shaft 88'. In moving through one-tenth of a revolution, it advances said wheel 88, so that a lengthened or thickened tooth 86', next but one in advance of said narrow tooth, is moved down into a position midway between two pairs of longitudinal ribs 90', formed on a cylinder 90'' secured upon the secondary transfer shaft 90, said ribs coöperating with the tooth 86' in the manner of gear teeth. Since the secondary transfer shaft 90 revolves rapidly, for the reason hereinafter described, the leading rib of the next following pair of ribs will impinge against the rear side of the thickened tooth 86', and will complete the advance of the primary transfer wheel. As said primary transfer wheel is thus advanced, the thickened tooth 86' immediately following the narrow tooth 86 which was so actuated by the lug 85, passes between the somewhat broadened teeth 89 of the next computing wheel to the left, and, by engagement with said teeth, advances said computing wheel through one-tenth of a revolution, then assuming the position shown in Figs. 6 and 8, in which the next narrow tooth 86 is then in position to be engaged by the lug 85 after another complete revolution of the corresponding computing wheel.

The reason why the ribs on the secondary transfer cylinders 90'' are made in pairs, is to provide for the operation of subtraction as well as addition, the leading rib in either direction of motion of said cylinder being the operating rib.

I will now describe in detail the manner in which the secondary transfer shaft 90 is rotated. However, the invention is not limited to the specific means here shown for accomplishing this purpose. Said transfer shaft extends (Fig. 1) between the two end plates of the carriage 79, parallel with the computing shaft. This shaft is rotated with the movement of the computing or typewriter carriage, and for this purpose, said shaft has secured on each end a bevel gear 96, and these gears 96 mesh with bevel gears 97 on transverse shafts 98, carried by the ends of the computing carriage, and carry, on their rear ends pinions 99, which mesh with gear wheels 100, which are loose on transverse shafts 101, also carried by the computing carriage. On the front ends of said shafts 101 are secured the gear wheels 108 which mesh with the stationary rack 81. As the computing carriage travels to the left, the gear wheels 108, being thereby rotated in the direction of the arrow in Fig. 26, rotate the shafts 101. Secured to said shafts 101, in front of the gear wheels 100, are notched wheels 104, and on the faces of the wheels 100 are pivoted the double pawls 105 having central arms 106, the ends of which are pressed, to one side or the other, by flat springs 107, secured to the faces of the wheels 100. Each spring 107, therefore, tends to maintain one of the noses of its corresponding pawl in engagement with wheel 104. But by reason of said noses being to one side of the pivot of the pawl 105, said pawl operatively engages said notched wheel when the latter is rotating in one direction only. The two pawls 105 are oppositely arranged, so that when either operatively engages its notched wheel, the other slips over its notched wheel without engaging. Thus, supposing that the computing carriage is traveling to the left, and the parts are in the position shown in Fig. 26, the pawl 105 will operate to connect the wheel 100 with the wheel 104, imparting a right-handed rotation to the secondary transfer shaft 90, looking along said shaft to the left; but the pawl 105 at the left end of the carriage will be inoperative. When the carriage returns, the pawl 105 on the right will be inoperative, and that on the left operative; and it will be readily seen that the connection is such as to rotate the secondary transfer shaft 90 in the same direction as before.

It may be here stated that the object of using two-nosed pawls is to employ the secondary transfer shaft for subtracting, when desired, as will be more fully hereinafter explained. When it is desired to so use it, the position of each pawl is changed, so that its other nose is now pressed by the spring against the notched wheel. This has the effect of turning the secondary transfer shaft in the reverse direction.

It has already been stated that the computing wheels are arranged to correspond with the typewriting spaces of the typewriter. They are, however, arranged in groups of three, corresponding to three such typewriter spaces, each group being spaced from the next adjacent group an interval corresponding with the fourth such typewriter space. The intervening space between the figures of the computing wheels may be occupied by a period or comma, or may be left blank, but such intervening space in either case serves to divide such figures into groups of three. In other words, the whole line of figures displayed by the machine will be divided into groups of three, each group being spaced from the next adjacent group by an interval not more than one typewriter space, and the three computing wheels of a group corresponding to three such typewriter spaces. This arrangement enables the operator to insert commas or periods at the end of each group of three figures just in the same way as in ordinary typewriting, so that the hundreds are shown plainly divided from the thousands, and the hundreds of thousands from the millions, and so on.

At the same time the construction is such as to permit of carrying from the computing wheel on the left of any group to the computing wheel on the right of the next adjacent group to the left, through the intervening space between the two groups. For this purpose, every third computing wheel, and the corresponding figure wheel, are each made of an excessive width, as compared with the other two computing or figure wheels so as to extend across said intervening spaces between the group of figure wheels, and the primary transfer wheels corresponding to the transfer wheels are also made correspondingly wide. An extra wide computing wheel 72ˣ is shown in detail in Fig. 12, having a wide flange 72′, and also seen at the sides of Fig. 10, and an extra wide primary transfer wheel 88ˣ is shown in detail in Fig. 13. Said wide primary transfer wheel differs only from the narrow transfer wheel in that, instead of each wide tooth of the latter, the former has two separate teeth 86ˣ, 86ʸ, in axial alinement with each other, the difference being one of form only. In the case of the narrow wheel, these two teeth join each other and form one tooth 86′, whereas, in the case of the wide wheel, the teeth are separated from each other a distance corresponding to a typewriter space. The extra wide computing wheels 72ˣ differ from the other two computing wheels only in having an extra deep crown flange 72′, which is made of sufficient depth to occupy the space between adjacent groups. It may be here observed that when the teeth 70 upon the computing shaft 35 arrive at the space immediately within this deep crown flange 72′, they are inoperative to turn any computing wheel. It therefore follows that, as the typewriter carriage moves successively through typewriter spaces, the teeth 70 of the computing shaft 35 are successively brought into three operative positions, in which it can engage computing wheels, and then, at the fourth such movement, into a position in which it is inoperative, having arrived at the space within the crown flange 72′ of a wide computing wheel. From this it results that should the operator strike a numeral key in the wrong position, that is, out of one of the columns of figures, this would cause no change in the figures, for although the computing shaft would be rotated thereby, the teeth 70 of said shaft would be revolving in a position in which they could not engage any computing wheel.

Each partition 80 may be formed with a curved rib 109, which at the part appearing through the cover strip, may be formed with a period or a comma to correspond with the point of separation into groups of three wheels. The result is that the entire row of characters appearing through the cover strip is divided into groups of three numerals, the groups being separated by one typewriter letter space. It will have been perceived that in the present invention a considerable number of separate and independent columns may be added at the same time. But, when any part of a group of computing devices is not being used, the corresponding wheels will show through the cover strip at zero, and therefore, in order to avoid uncertainty as to the termination of the figures making the total, there are provided small shutters 110, which can slide on a rod 111 to cover either the space intervening between two groups, or the last figure wheel of a group when computing cents, and also to indicate the beginning of the figures which form the respective columns.

Figures 6, 7, 8, 9, 10, 11, 12, 13:
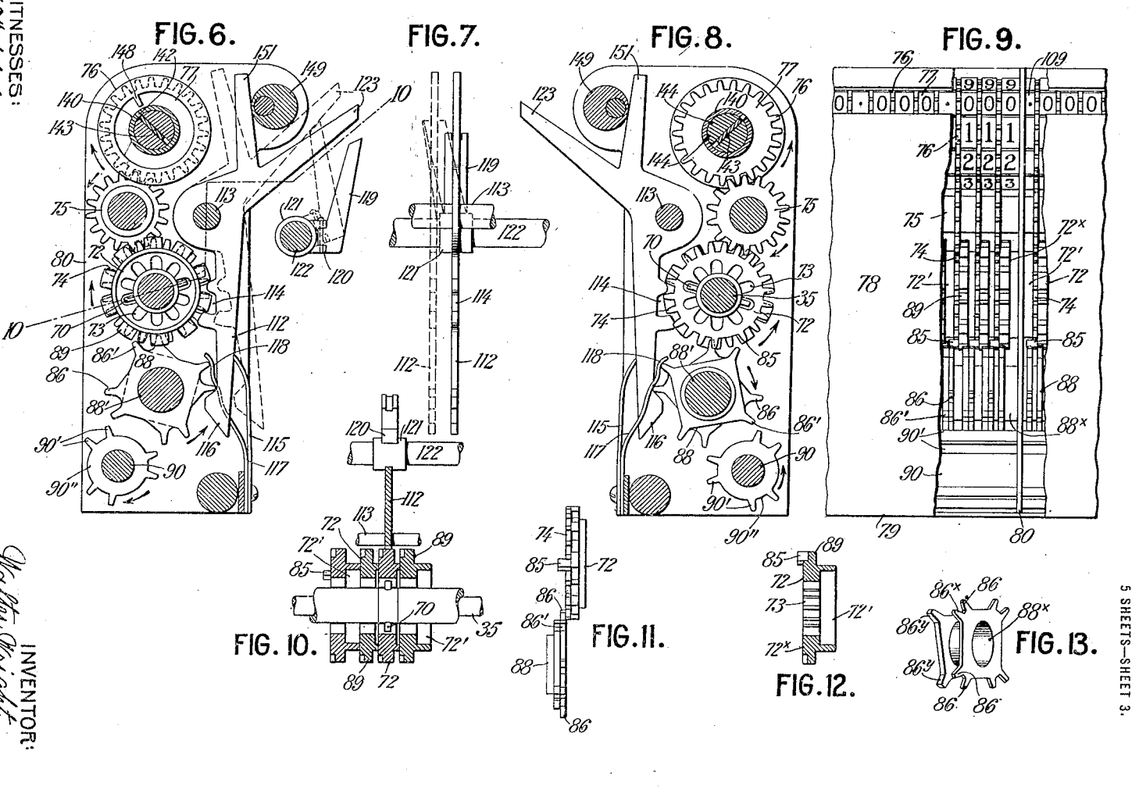
Fig. 6 is a transverse section of the computing and figure wheels, and mechanism coöperating therewith.
Fig. 7 is a front view of the locking lever and releasing lever.
Fig. 8 is a view similar to Fig. 6, looking from the left.
Fig. 9 is a broken enlarged front view of the computing and figure wheels, and the mechanism coöperating therewith.
Fig. 10 is a horizontal section on the line 10—10 of Fig. 6.
Fig. 11 is a detail front view, showing one of the computing wheels, and the primary transfer wheel adapted to be engaged thereby, attached.
Fig. 12 is a sectional view of one of the computing wheels.
Fig. 13 is a perspective view of a transfer wheel.
Figures 14, 15, 16, 17, 18:
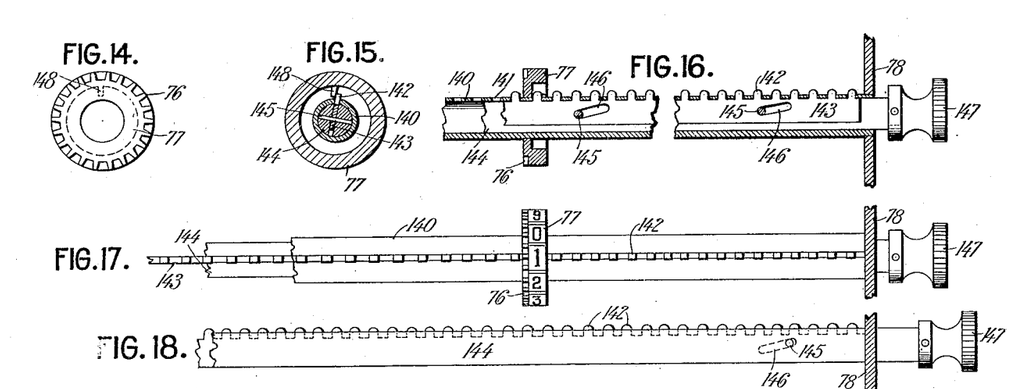
Fig. 14 is a side view of one of the figure wheels.
Fig. 15 is a cross-sectional view of the same.
Fig. 16 is a broken longitudinal view of the shaft carrying the figure wheels.
Fig. 17 is a plan view of said shaft.
Fig. 18 is a side view of said shaft, showing the teeth withdrawn to escape the resetting lugs 148.
Figure 19:
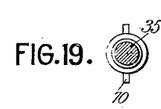
Fig. 19 is a cross-section of the computing shaft.
Figure 20:
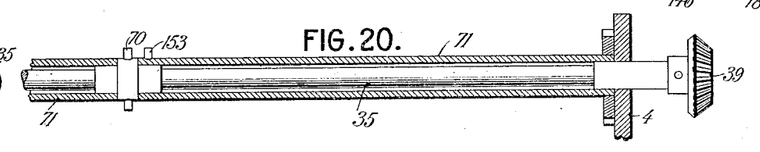
Fig. 20 is a broken side view of the computing shaft, the tubes being shown in section.
Figures 21, 22, 23:
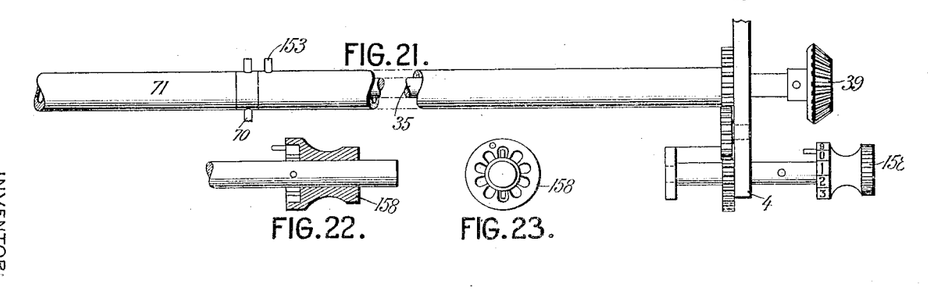
Fig. 21 is a broken plan view of the same.
Fig. 22 is an enlarged sectional view of the error-correcting knob.
Fig. 23 is a side view of the same.

*Locking mechanism.*—A most important consideration in regard to computing mechanism is accuracy. The computing wheels should not by any possibility move from their proper position except when positively advanced by mechanism for that purpose. To insure this I provide the following locking mechanism: For each computing wheel there is provided a locking lever 112, all of said levers being pivotally mounted upon a bar 113 extending longitudinally between the ends of the computing carriage. Each lever has a recess or notch 114 which is adapted to engage any one of the teeth 89 formed upon the corresponding computing wheel 72. Said lever 112 is normally pressed against the primary transfer wheel by means of a spring 115, and the end of the same arm is formed with a beveled head 116 which, when the primary transfer wheel begins to rotate, is moved outward by a tooth 86′ of said wheel, and so moves the locking lever from its locking position. Said transfer wheel is locked against accidental rotation by means of a spring 117 having a hump 118 which passes between any one of the pairs of teeth on said transfer wheel.

*Releasing mechanism.*—It is, of course, necessary to release said locking lever 112, in order to rotate the computing wheel, and for this purpose there is provided a finger 119, (Fig. 7), which is pivoted in a fork 120 on a collar 121 secured upon the center of a longitudinal rock shaft 122 which extends between the plate 4 and frame 38 and has bearings therein. Said collar is thus in the same vertical plane as the teeth 70 on the computing shaft 35. Consequently, it acts only upon the locking lever corresponding to the computing wheel, which, having arrived at the middle of the shaft 35, is in position to be rotated by the turning of said shaft. The end of the finger 119 lies immediately behind a releasing arm 123 extending outwardly and rearwardly from said lever 112, and, upon the rocking forward of said finger 119, said arm 123 is also rocked forward, moving the notch 114 in the lever 112 out of engagement with a tooth 89 on the computing wheel, and releasing said wheel. To so rock the finger 119 forward, there is secured upon the right end of the rock shaft 122 an arm 132 to the end of which is pivotally connected a depending link 133, the lower end of which is pivotally connected to the horizontal arm of the bell-crank 200. At the depression of the numeral key lever 16, the rear end of the extension 193 will rock a lever 197 in counter-clockwise direction, (Figs. 4 and 30) and through the intermediary of the link 199, the bell-crank 200 and link 133, will rock the arm 132 and shaft 122 in counter-clockwise direction, as seen in Figs. 4 and 6, so as to rock forwardly the finger 119 and arm 123 of the locking lever 112, which is in engaging relation with the finger 119 at the time of the depression of said numeral key, thus releasing the associated computing wheel 72 so that it may freely be rotated by the computing shaft 35. At the release of the numeral key the lever 197 and connected part will return to their normal (Fig. 30) position, and immediately the notch 114 in the locking lever engages the tooth 89 opposite thereto of the computing wheel, and insures that the figures of the figure wheels will be in exact alinement. The locking levers of the computing shaft, and which may have been already acted upon by said shaft, are released only at the instant that the transfer is made thereon from the wheel corresponding to the next lower denomination, and this is effected by the same movement of the primary transfer wheel which advances the computing wheel one-tenth of a revolution, this being accomplished by a wide tooth 86' engaging the head 116 of the lever 112 of the corresponding computing wheel and pushing it away from said computing wheel.

*Resetting mechanism.*—In order to reset all the figure wheels to zero, the following mechanism is provided: Said wheels turn loosely upon a tube 140 (Figs. 15, 16, 17, and 18) having a longitudinal series of apertures 141, through which extend teeth 142 formed upon a flat bar 143. Said bar slides between two approximately half-round rods 144 connected by pins 145, which pass through oblique slots 146 in the flat bar 143. The rods 144 are connected at one end with a knob 147. By pushing said knob to the left, said pins, acting in said slots, push the flat bar 143 outward, so that the teeth 142 project beyond the apertured tube. Each tooth is then in position to engage a radial lug 148 of the figure wheel extending into a cavity formed therein. But before said wheels can be reset to zero they must be unlocked. This is effected by means of an eccentric shaft 149 carrying a small knob 150 on its end projecting through the plate 4, said eccentric bearing against an upwardly extending arm 151 of each locking lever. Upon turning said knob, the movement of the shaft 149 causes the wide part of the eccentric to engage said arms 151, and thereby move the locking levers out of engagement with the computing wheels, permitting said computing wheels and figure wheels to turn freely. Then, to reset to zero, the knob 147 is first pushed to the left, and then rotated, whereupon the teeth 142 are first pushed outwardly, and then rotated, whereupon the teeth 142 revolve until they strike the lugs 148, which happens sooner or later with the several wheels according to the position in which they have been left by the previous computation, and since these lugs 148 extend from all the figure wheels, the effect will be to bring all of said wheels into register with each other as regards the figures. Said wheels can thus be turned back so that all the zeros thereon appear at the slot in the casing 78. The knob 147 is then moved to the right, which withdraws the teeth 142 into the slotted tube, leaving the wheels free to rotate, and the knob 150 is turned back.

*Error correction.*—It is desirable to provide means for correcting an error made by inadvertently striking the wrong numeral key of the typewriting machine. On the left-hand end of the tube 71, which surrounds the right half of the computing shaft 35, is formed a correcting tooth 153, (Figs. 20 and 21) the normal position of which will be in line with one of the recesses of the internal gear of the computing wheels, so that said tooth is caused to engage such a recess. Thereby said computing wheel can be turned back to any desired position, preferably the original position before the wrong numeral key was struck. Suppose, for instance, the operator intended to strike the numeral key "6," but by inadvertence struck the numeral key "7," then it would be desirable to turn back the computing wheels seven-tenths of a revolution. This operation could be performed either before or after the operator erases the wrongly written numeral. After both operations have been performed, the computing mechanism has been brought back to the same condition as before the error.

Since this operation can only take place if the computing wheel acted upon is unlocked, provision must be made for automatically unlocking the same before the correction is made. For this purpose the knob 158 (Fig. 21) is caused in its movement to the left, to engage the upper inclined surface of a crank arm 162 (Fig. 1) on a transverse shaft 163 which also carries an arm 164, shown in Fig. 4, and in dotted line in Fig. 28, which extends over a pin 165 on the hanger rod 129, so that the movement of the knob to the left depresses the arm 128 (Figs. 4 and 28) causing it to engage the stop 126, and thus causing the finger 119 to engage the rear of the locking lever, releasing said lever.

*Subtracting.*—The attachment may also be used for subtracting. For this purpose a bevel gear 201 (Fig. 4), opposite to the gear 40, is secured on the shaft 41 so as to mesh with the gear 39. The shaft 41 will by this gear 201 be driven in the reverse direction, which will effect the operation of subtracting. Any suitable shifter may be employed. In the form of shifter shown in the embodiment of this invention, the shifter 211 may be shifted along the drive-shaft 41, to connect either pinion 40 or pinion 201 thereto, the shifter being operated by the usual handle 212. Instead of the means shown for shifting and securing these gears, any common shifter can be used.

Also by means of this subtracting device, errors can be corrected. Thus, if the wrong numeral key has been struck, then by changing the mechanism to subtract instead of to add, and operating again the same numeral key, the numeral wrongly added will be subtracted. Then the mechanism can be brought back again to addition, and the regular operation of the machine continued. The subtracting mechanism may also be used for the purpose of resetting the figures.

Variations may be resorted to within the scope of the invention, and portions of the improvements may be used without others.

Having thus described my invention, I claim:

1. The combination with a series of number keys and a series of computing wheels, of a master wheel driven by said keys and coöperating individually with each of said computing wheels to run up numbers thereon, means individual to each computing wheel for initiating a carry-over operation, means actuated by said first-mentioned means for carrying one complete revolution of each computing wheel so as to cause a partial revolution of the next adjacent computing wheel, and power-driven assisting means independent of the power applied to said keys, for driving said last-mentioned means the remaining distance necessary to complete the carry-over operation, said power-driven assisting means being effective to effect the completion of a carry-over operation to all computing wheels of higher denomination than the one with which the master wheel coöperates.

2. The combination with a series of computing wheels and a series of number keys, of a master wheel driven by said keys to coöperate successively with said computing wheels to run up numbers therein, and a power-driven carry-over mechanism for said computing wheels effective at the operation of said master wheel to turn over between "9" and "0" all computing wheels of higher denomination simultaneously with the running up of a digit in any computing wheel effecting a turn over between "9" and "0," said carry-over mechanism independent of the power applied to said keys.

3. The combination with a series of numeral keys and a series of computing wheels, said keys acting to drive said computing wheels digit by digit, of tens-carrying mechanism for said computing wheels, and a boosting device driven from a source other than said computing wheels and other than said keys, to assist in the carry-over operation, said boosting device being effective upon the turning of each computing wheel to zero position and before the running up of the next digit.

4. The combination with numeral keys and a series of computing wheels, said keys acting to drive said computing wheels digit by digit, of a tens-carrying mechanism for said computing wheels, and a boosting device for said tens-carrying mechanism independent of said keys and coming into play automatically upon the turning of each of said computing wheels to zero position.

5. The combination with a typewriting machine, including a traveling carriage, and numeral keys, of a series of computing wheels driven by said keys, said computing wheels being so numerous as to have a capacity of several complete adding zones for each run of the typewriter carriage, carry-over mechanism extending the full length of said series of computing wheels so as to be operable to carry between any computing wheel in a series to the next adjacent computing wheel, and assisting driving means for said carry-over mechanism distinct from said computing wheels for relieving the keys of a part of the burden of carrying from one wheel to the next.

6. The combination with a series of computing wheels and numeral keys for driving said wheels successively, of a tens-carrying mechanism including a power-actuated device coöperative with any of said wheels at the operation of any numeral key, to turn the wheel of next higher denomination.

7. The combination with computing devices and numeral keys, said keys acting to drive said computing devices successively, of a carry-over mechanism for said computing devices, said carry-over mechanism including an assisting device effective at the operations of the numeral keys.

8. The combination with a series of computing wheels, of computing mechanism for running up numbers in said computing wheels, a series of numeral keys for driving said computing mechanism, tens-carrying mechanism for said computing wheels, and a source of power outside of said keys for driving said tens-carrying mechanism; said tens-carrying mechanism and said source of power both brought into play at the striking of said numeral keys.

9. The combination with a series of computing wheels, of numeral keys for driving said computing wheels digit by digit, carry-over mechanism for said computing wheels, and an assisting or boosting mechanism effective at the operation of said keys and simultaneously with the running up of a single digit in any computing wheel to aid in the completion of a carry-over operation started by the computing wheel having a digit run up therein, for all computing wheels of higher denomination.

10. The combination with a series of computing wheels, of a series of numeral keys, means to enable the keys to drive said computing wheels one by one, a carry-over mechanism for said computing wheels effective at the striking of each numeral key to enable the carrying of tens between higher and lower denominations of said computing wheels, and a drive for said carry-over mechanism independent of the extent of movement of said computing wheels.

11. The combination with a series of computing wheels, of a series of numeral keys for driving said computing wheels one by one as the numeral keys are actuated, a carry-over mechanism for said computing wheels acting for the running in of each digit, to enable the carrying of tens between higher and lower denominations of said computing wheels, and a drive for said carry-over mechanism rotating amounts independent of the particular numeral keys actuated.

12. The combination with numeral keys and a series of reversible computing wheels, of a reversible master wheel driven by the keys to coöperate successively with said computing wheels, and a reversible power-driven carry-over mechanism effective at the operation of said master wheel, to turn over in either direction between "9" and "0" all computing wheels of higher denomination than that upon which the master wheel is acting.

13. The combination with numeral keys and a series of computing wheels, said keys acting to drive said computing wheels digit by digit, of tens-carrying mechanism for said computing wheels, a boosting device driven from a source other than said computing wheels to assist in the carry-over operation, said boosting device being effective upon the turning of each computing wheel to zero position and before the running up of the next digit, and devices shiftable to reverse the operation of the computing wheels and boosting device.

WALTER WRIGHT.

Witnesses:
W. O. WESTPHAL,
JULIUS DUCKSTINE.

Copies of this patent may be obtained for five cents each, by addressing the "Commissioner of Patents, Washington, D. C."